Figure 1:
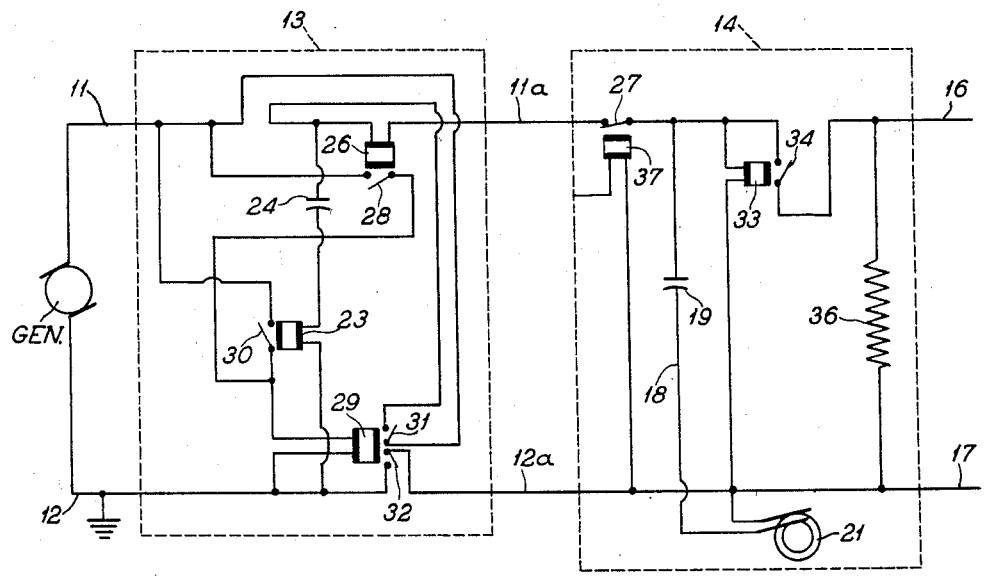

April 7, 1959     C. O. WOOD     2,881,361
GROUND PROTECTION DEVICE
Filed Nov. 1, 1956

INVENTOR.
Claude O. Wood
BY
Murray A. Gleeson
ATTORNEY

United States Patent Office 2,881,361
Patented Apr. 7, 1959

2,881,361

GROUND PROTECTION DEVICE

Claude O. Wood, Chicago, Ill., assignor to Goodman Manufacturing Company, Chicago, Ill., a corporation of Illinois Application November 1, 1956, Serial No. 619,728

5 Claims. (Cl. 317—18)

This invention relates to ground protection devices for electrically operated machines.

It is a principal object of the invention to protect operators against hazard in the operation of electrically powered machines supplied with power from a remote point by a supply cable, as well as to protect both the machine and the supply cable thereto.

According to the present invention the occurrence of only a very small potential above ground in the machine will cause the supply circuit thereto to be opened, and if the occurrence of such very small potential is for an instant only the circuit can be reset at the will of the operator of the machine, the reopening of the supply circuit at such resetting indicating to the operator the existence of an unintended continued ground at the machine.

In an alternate form of the invention, and when the machine is operating on conductive earth, the supply leads have a balanced current relay connected therein which becomes unbalanced when the machine is at a potential above ground.

In either form of the invention, the circuit to the machine is energized for initial operation by the resetting of the ground protection device, so that the supply circuit can be energized only when the machine is attended by the operator.

Other objects and important features of the invention will be apparent from a study of the specification following taken with the drawing which together shows a number of preferred embodiments of the invention and what are intended to be the best modes of practicing the principles thereof. Other embodiments may be suggested to those having the benefit of the teachings herein and such other embodiments are intended to be reserved especially as they fall within the scope of the subjoined claims.

Figure 2:
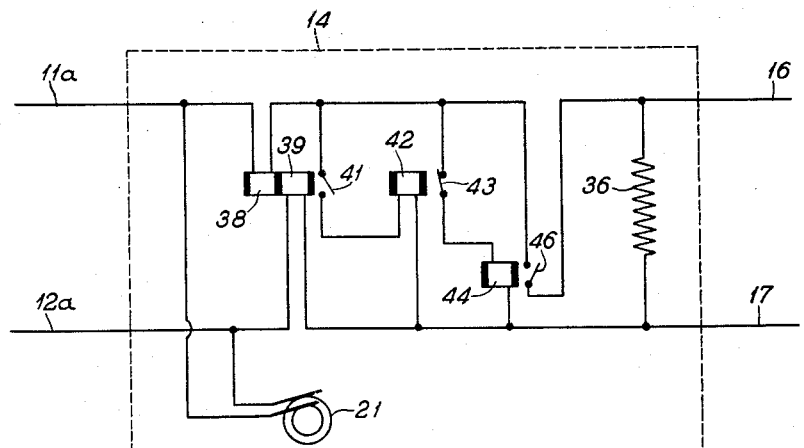

In the drawing:

Fig. 1 is a circuit diagram illustrating a ground protection device according to the present invention; and Fig. 2 is a circuit diagram illustrating an alternate embodiment thereof.

Referring now particularly to Fig. 1 of the drawing, there is shown a pair of power leads 11 and 12 leading from a direct current generator and connected to a junction box 13 which may be placed at the entry of a mine or the like. Trailing cable leads 11a and 12a extend from the junction box 13, and are protected in a cable sheath, not shown, to a control box 14 on a mining machine or the like. Such a machine may be a boring type miner which advances into a working face and with respect to the position of the junction box 13. Cable 12 from the generator shown is grounded.

Means are provided at the control box 14 to supply power to power leads 16 and 17 to operate the machine. To this end the trailing leads 11a and 12a at the control box 14 have connected thereacross a lead 18 having a capacitor 19 connected therein. A small generator of alternating current 21 is connected in the lead 18 and by a lead 22 to the lead 12.

The alternating current generator 21 may, by way of example, be a hand cranked generator similar to those used in rural telephony or a battery operated vibrator or the like. Irrespective of the form of the device 21 for generating an alternating voltage, the voltage developed thereby energizes an alternating current relay winding 23 connected in series with a capacitor 24 and across the power leads 11 and 12 at the junction box 13. A circuit is then completed which includes a lead relay winding 26 at the junction box 13 and a normally closed contact 27 in trailing lead 11a at the control box 14.

The energization of the alternating current relay winding 23 closes a contact 30 in series with a main line contactor winding 29, both being connected across the power leads 11 and 12 at the junction box 13. When contactor winding 29 is energized, main line contacts 31 and 32 in the respective power leads 11a and 12a at the junction box 13 are closed.

The energization of contactor winding 29 and the closing of main line contacts 31 and 32 will cause full direct current voltage to be impressed across trailing cables 11a and 12a across a relay winding 33 connected across the power leads 11 and 12 at the control box 14. When winding 33 is energized, a contact 34 associated therewith closes, power then being available across the output power leads 16 and 17. A "false load" or load resistance 36 is connected across the power leads 16 and 17, and the current through resistance 36 is of a value sufficient to actuate the lead relay winding 26 and close a lead relay contact 28 operated thereby to maintain the winding 29 energized and the contacts 31 and 32 closed.

If for any reason the machine upon which the control box 14 is mounted has a potential above ground by reason of a faulty electrical connection or the like, means are provided for cutting off the power to the machine thereby to prevent damage to its electrical components or its operator.

The machine, not shown, has accordingly connected thereto a relay winding 37 having the contact 27 controlled thereby. When the potential across the winding 37 is in excess of any predetermined amount, the contact 27 associated therewith will open. This will cause the lead relay winding 26 to be deenergized and the contacts 28 operated thereby to open. The alternating current relay winding 23 connected across the direct current power leads 11 and 12 at the junction box 13 cannot be reenergized without operating the alternating current generator 21, and since the capacitor 24 blocks the flow of direct current through relay winding 23, it will remain deenergized, and the contact 30 operated thereby will also remain open.

Since at this time both contacts 28 and 30 are open, relay winding 29 will be deenergized and the main line contacts 31 and 32 will be opened.

If the occurrence of the potential across the winding 37 is non-recurrent, the power supply at the leads 16 and 17 to the machine may once more be reactivated. Under such condition the alternating current generator 21 is once more operated, and the sequence of operations obtaining during the starting operation is once more repeated. However, if the operation of the generator 21 does not result in the development of voltage across the power leads 16 and 17, the operator will understand that the contacts 27 are open and that a potential still exists across the winding 37, thereby indicating the presence of a dangerous potential at the machine upon which the control box 14 is mounted. If, however, a sufficient load is maintained across the resistor 36 the winding 26 will remain energized to thereby hold contacts 28 closed, and by the energization of the winding 29 contacts 31 and 32.

Referring now to Fig. 2 of the drawings, there is shown an alternate embodiment wherein the trailing power leads 11a and 12a operate at different current values by reason of the machine resting upon conductive earth and having an unwanted ground therein. Power lead 11a accordingly has a winding 38 therein, and lead 12a has a similar winding 39 therein arranged in "bucking" relationship so that a contact 41 is maintained in open condition, and a relay winding 42 connected in series therewith across the power leads 11 and 12 is maintained in deenergized condition.

When winding 42 is deenergized contacts 43 associated therewith and connected in series with a relay winding 44 across the power leads 11 and 12 will be maintained in closed position, thereby to energize the winding 44. Contacts 46 are closed by the energization of relay winding 44 to develop voltage across the "false load" or load resistance 36, and initiate the same sequence of operation as desired with reference to Fig. 1.

Upon such operation of the alternating current generator 21 voltage will result across the power leads 16 and 17 unless the ground condition described still obtains, whereupon the current flowing in the windings 38 and 39 will be unbalanced to cause the sequence of operation previously described with reference to Fig. 2.

The scope of the invention is intended to be limited only by the claims here appended.

I claim:

1. A ground protection device for an electrically powered machine supplied with electrical power by a direct current generator having a trailing cable including a pair of leads connected to a power junction disposed at a point remote from the machine comprising: a control point at said machine, means at said machine adapted to be deenergized when a ground potential at said machine is less than a predetermined amount, a contact at said control station which is closed when said ground potential is less than said predetermined amount, a generator of alternating current at said control station, an alternating current relay including a capacitor in series therewith connected across the leads at said junction, an alternating current relay contact having a main line contact relay winding in series therewith, said alternating current generator being temporarily operable to maintain a circuit through said alternating current relay to close its contact and energize said main line contact relay, main line contacts in said leads closed by energization of said main line contact relay, a lead relay at said junction and a lead relay contact in parallel with said alternating current relay contact, a control station relay energized when said main line contacts are closed and a contact closed thereby, a load connected across said leads at said control station by closing of said last named contact, said load being of a value to maintain said lead relay energized when said first named means is maintained in deenergized condition.

2. A ground protection device for an electrically powered machine supplied with electrical power by a direct current generator including a trailing cable having a pair of leads connected to a power junction disposed at a point remote from the machine comprising: a control point at said machine, a relay winding at said machine adapted to be deenergized when a ground potential at said machine is less than a predetermined amount, a contact at said control station which is closed when said ground potential is less than said predetermined amount, a generator of alternating current at said control station, an alternating current relay including a capacitor in series therewith connected across the leads at said junction, an alternating current relay contact having a main line contact relay in series therewith, said alternating current generator being temporarily operable to maintain a circuit through said alternating current relay to close its contact and energize said main line contact relay, main line contacts in said leads closed by energization of said main line contact relay, a lead relay at said junction and a lead relay contact in parallel with said alternating current relay contact, a control station relay energized when said main line contacts are closed and a contact closed thereby, a load connected across said leads at said control station by closing of said last named contact, said load being of a value to maintain said lead relay energized when said first named relay winding is deenergized.

3. A ground protection device for an electrically powered machine supplied with electrical power by a direct current generator including a trailing cable having a pair of leads connected to a power junction disposed at a point remote from the machine comprising: a control point at said machine, a relay winding at said machine adapted to be deenergized when a ground potential at said machine is less than a predetermined amount, said winding being connected between said machine and one of said power leads, a contact at said control station which is closed when said ground potential is less than said predetermined amount, a generator of alternating current at said control station, an alternating current relay including a capacitor in series therewith connected across the leads at said junction, an alternating current relay contact having a main line contact relay in series therewith, said alternating current generator being temporarily operable to maintain a circuit through said alternating current relay to close its contact and energize said main line contact relay, main line contacts in said leads closed by energization of said main line contact relay, a lead relay at said junction and a lead relay contact in parallel with said alternating current relay contact, a control station relay energized when said main line contacts are closed and a contact closed thereby, a load connected across said leads at said control station by closing of said last named contact, said load being of a value to maintain said lead relay energized when said first named relay is deenergized.

4. A ground protection device for an electrically powered machine supplied with electrical power by a direct current generator including a trailing cable having a pair of leads connected to a power junction disposed at a point remote from the machine comprising: a control point at said machine, a pair of opposed windings at said machine, said windings including a contact controlled thereby which is opened when said ground potential is less than a predetermined amount, a generator of alternating current at said control station, an alternating current relay including a capacitor in series therewith connected across the leads at said junction, an alternating current relay contact having a main line contact relay in series therewith, said alterating current generator being temporarily operable to maintain a circuit through said alternating current relay to close its contact and energize said main line contact relay, main line contacts in said leads closed by energization of said main line contact relay, a lead relay at said junction and a lead relay contact in parallel with said alternating current relay contact, a control station relay energized when said main line contacts are closed and a contact closed thereby, a load connected across said leads at said control station by closing of said last named contact, said load being of a value to maintain said lead relay energized when said first named windings are energized equally.

5. A ground protection device for an electrically powered machine supplied with electrical power by direct current generator including a trailing cable having a pair of leads connected to a power junction disposed at a point remote from the machine comprising: a control point at said machine, a relay winding at said machine adapted to be deenergized when a ground potential at said machine is less than a predetermined amount, said winding being connected between said machine and one of said power leads, a contact closed when said ground potential is less than said predetermined amount, a generator of alternating current at said control station, means operable in response to a voltage from said alternating current generator including main line contacts in said leads closed by temporary operation of said alternating current generator, a lead relay at said junction and a lead relay contact operable thereby, a control station relay energized when said main line contacts are closed and a contact closed thereby, a load connected across said leads at said control station by closing of said last named contact, said load being of a value to maintain said lead relay energized and said lead relay contact closed when said first named relay is deenergized.

References Cited in the file of this patent

UNITED STATES PATENTS 2,735,089  Pickell _____ Feb. 14, 1956